United States Patent [19]

Piskoti

[11] Patent Number: 4,633,002
[45] Date of Patent: Dec. 30, 1986

[54] AMINOFUNCTIONAL POLYSILOXANE COMPOUNDS AND METHOD OF PREPARATION THEREFOR

[75] Inventor: Charles Piskoti, Grand Blanc, Mich.
[73] Assignee: Charles Piskoti, Grand Blanc, Mich.
[21] Appl. No.: 642,885
[22] Filed: Aug. 21, 1984
[51] Int. Cl.$^4$ .............................................. C07F 7/10
[52] U.S. Cl. .................................. 556/411; 556/410; 106/38.22
[58] Field of Search .............................. 556/410, 411; 106/38.22

[56] References Cited

U.S. PATENT DOCUMENTS 4,100,112  7/1978  Blount .............................. 556/410 X Primary Examiner—Paul F. Shaver
Attorney, Agent, or Firm—Reising, Ethington, Barnard, Perry & Milton

[57] ABSTRACT

Aminofunctional organopolysiloxane fluids are prepared by reacting a hydroxy-terminated organopolysiloxane fluid and an aminofunctional organopolysiloxane fluid in the presence of organo-metallic salt catalyst.

15 Claims, No Drawings

AMINOFUNCTIONAL POLYSILOXANE COMPOUNDS AND METHOD OF PREPARATION THEREFOR

BACKGROUND OF THE INVENTION

1. Field of the Invention

This invention relates to polymeric organosilicone compounds and more particularly, to aminofunctional organopolysiloxanes and a method for their preparation.

2. Prior Art

Aminofunctional polysiloxane polymers have been prepared by mixing aminofunctional siloxanes with conventional hydroxy-terminated dimethylpolysiloxanes in the appropriate molar amounts and heating the resulting mixture to a temperature of from 100° C. to 200° C. Another method for the preparation of aminofunctional organopolysiloxane polymers disclosed in U.S. Pat. No. 2,947,711 to Bailey involves heating the reactants in the presence of catalytic amounts of sodium or potassium hydroxide or silanolate derivatives thereof. A third method for producing aminofunctional polysiloxane polymers discussed in U.S. Pat. No. 3,890,269 to Martin involves reaction in the presence of a catalyst selected from the group consisting of alkali metal hydrides, alkali metal alkyls, alkali metal alkenyls and alkali metal aryls.

It is known that organosilicone compounds containing Si—OH groups can be polycondensed by using cyclic organothio-tins as discussed in U.S. Pat. No. 3,819,673 issued to Sagi. It is, also, known that nitrogen-containing organopolysiloxanes can be produced by the reaction of organopolysiloxanes with allylamines in the presence of organo-platinum catalysts as discussed in U.S. Pat. No. 4,036,868 to Atherton. Tin halides and organo-tin compounds have been used to catalyze the polymerization of organosilicone compounds.

In the preparation of aminofunctional organopolysilicone compounds factors such as reaction time and product purity are of crucial importance.

Thus, the prior art has sought means and methods for improving product purity while reducing reaction time. In addition, the art has sought new and improved aminofunctional organosilicone compounds which evidence greater utility in their intended environments.

The compounds and method disclosed herein provide improved products prepared in minimal reaction time with the assurance of reasonable product purity. Additionally, the catalyst employed to carry out the reaction provides both handling ease and safety.

SUMMARY OF THE INVENTION

This present invention provides a process for the preparation of an aminofunctional organosilicone compound by the reaction of (a) an organosilicone compound containing hydroxy-terminated functional groups with (b) an aminofunctional silane in the presence of a catalytic amount of an organo-metallic compound.

The reaction is, generally, conducted at standard pressure and elevated temperatures not to exceed 500° C.

Suitable organo-metallic compounds include, for example, the organotin compounds, such as stannous octoate, dibutyltin dilaurate, stannous acetate, etc., and the like, as well as mixtures thereof.

The products produced hereby are useful as mold release agents, corrosion inhibitors, sizing agents, and so forth.

For a more complete understanding of the present invention reference is made to the following detailed description and accompanying examples thereof.

DESCRIPTION OF THE PREFERRED EMBODIMENTS

As hereinbefore noted, the present invention provides aminofunctional organopolysiloxane fluids prepared from the reaction of a hydroxy-terminated organosilicone compound and an amine silane compound in the presence of a catalytic amount of an organo-metallic compound. The reaction, generally, proceeds at a temperature ranging from about 250° C. to about 300° C.

More specifically, the present invention provides aminofunctional compounds prepared by the reaction of an organosilicone compound containing one or more hydroxy-terminated functional groups and an aminofunctional silane in the presence of an organo-metallic compound. Generally, the reactants are employed in a molar amount ranging from about 0.9:1.0 to about 1.1:1.0 molar equivalent of hydroxy equivalent to aminofunctional in the silane, and, preferably, equimolar amounts of the reactants are employed.

The reaction, as noted, generally, proceeds at a temperature ranging from about 250° C. to about 300° C., and, preferably, from about 270° C. to about 285° C. The reaction is ordinarily completed in about 60 to about 180 minutes.

The organosilicone compound containing the hydroxy-terminated functional groups correspond to the formula:

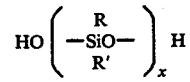

wherein R and R' are monovalent substituted or unsubstituted organic radicals having from about 1 to 18 carbons and x is an integer ranging from about 1 to about 1000. R and R' may or may not be the same.

Representative of the organic radicals represented by R and R' are alkyl radicals, e.g., methyl, ethyl, propyl, butyl, octyl, dodecyl and octadecyl; aryl-radicals, e.g., phenyl, diphenyl and naphthyl radicals; alkenyl radicals, e.g., vinyl and allyl radicals; cycloalkyl radicals, e.g., cyclobutyl, cyclopentyl and cyclohexyl; alkaryl radicals, e.g., tolyl, xylyl, ethylphenyl; aralkyl radicals, e.g., benzyl, a-phenyl ethyl, B-phenylethyl and a-phenylbutyl; and the halo substituted radicals enumerated above. In general the polysiloxane fluids should have a viscosity of between about 5 cps. and 1,000,000 cps., and more preferably between about 50 cps. and 300,000 cps., at 25° C. In addition, it is possible to combine high and low viscosity fluids to form a fluid having the desired viscosity range.

These compounds, generally, contain from about 0.1 percent to about 10 percent by weight of terminal hydroxy groups, based on the weight of the fluid. These compounds are commercially available, such as that sold by Dow Corning under the name Q-1-3563, Union Carbide L-9000 Silicone Fluid, etc.

The aminofunctional silanes which are reacted with the organopolysiloxanes may be represented by the general formula:

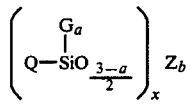

wherein G represents the radicals R, OR', OR" NR'$_2$, or OSiR$_3$ in which R is the same as R above, R' represents hydrogen, or monovalent hydrocarbon radicals having from 1 to 18 carbon atoms, R" is a substituted, or unsubstituted divalent hydrocarbon radical having from 1 to 18 carbon atoms, a substituted, or unsubstituted divalent hydrocarbonoxy radical in which the oxygen is in the form of an ether linkage, or an unsaturated divalent hydrocarbon radical Q represents the radicals.

R'$_2$NR"—,

R'$_2$NR"N'R"— and,

R'$_2$NR"OR"—,

Z is a radical selected from the group consisting of R'O$_{0.5}$, R$_3$SiO$_{0.5}$ and R'$_2$NR"O$_{0.5}$, in which R, R' and R" are the same as above, a is a number of from 0 to 2, b is a number of from 0 to 3 and x is a number of from 1 to 20,000.

Examples of suitable divalent radicals represented by R" are hydrocarbon radicals having from 1 to 18 carbon atoms, such as ethylene, trimethylene, tetramethylene, hexamethylene, octamethylene; hydrocarbonoxy radicals having the formula:

(—OC$_2$H$_4$—)r, (—OC$_2$H$_4$OCH$_2$—)r and
(—OC$_3$H$_6$—)r in which r is a number of from 1 to 50, such as ethylene oxide, trimethylene oxide and polymers thereof and alkenylene radicals such as vinylene, propenylene, butenylene, hexenylene and the like.

Examples of suitable aminofunctional silanes are B-aminopropyltriethoxysilane, γ-aminopropyltrimethoxysilane, methyl-B-(aminoethyl) γ-aminopropyldimethoxysilane, omega-aminohexyltributoxysilane, B-(aminoethoxy)propyltrimethoxysilane, B-(aminoethoxy)hexyltriethyoxysilane, B-(aminopropoxy)butyltributoxysilane, methyl-B-(aminopropoxy)propyldi(aminoethoxy)silane, N-β-(aminoethyl)-γ-aminopropyltrimethoxysilane,

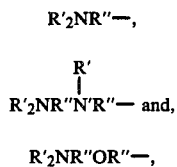

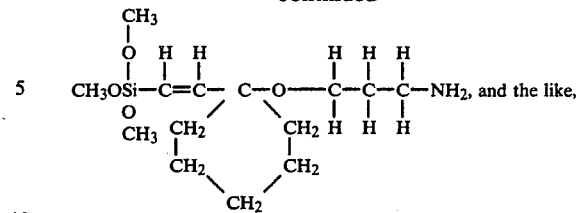

as well as mixtures thereof.

The organo-metallic compounds useful as catalysts herein are organo-metallic salt catalysts which include, for example, stannous acetate, stannous butyrate, stannous 2-ethylhexoate, stannous pentane carboxylate, cadmium cyclohexane carboxylate, lead naphthenate, lead octoate, cobalt naphthenate, zinc naphthenate, bis(phenylmercurydodecyl)succinate, phenylmercuric benzoate, cadmium naphthenate, dibutyltin dilaurate, dibutyltin diacetate, and dibutyltin di-2-ethylhexanoate.

Preferably, the organo-metallic catalyst is dibutyltin dilaurate. The catalyst is employed in catalytically effective amounts ranging from about 0.4 percent to about 1.0 percent, by weight, based on the weight of the hydroxy-terminated organopolysiloxane, as noted.

In preparing the products hereof, the hydroxy-terminated organosilicone compound and the amine silane organosilicone compound are reacted at a temperature ranging from about 250° C. to about 300° C., and, preferably, from about 270° C. to about 285° C.

As noted, the reactants are employed in a equivalent ratio of about 0.9:1.0 to about 1.1:1.0 of functional hydroxy groups in the hydroxy-terminated compound to functional amino groups in the aminofunctional silane, and, preferably, a 1.0:1.0 equivalent ratio of reactive groups are employed.

The products produced hereby are liquid having a viscosity of about 100 to about 400 cps and higher at 25° C.

It has been observed that sometimes the blend of hydroxy-terminated organopolysiloxane fluid and aminofunctional fluid may form a gel upon exposure to the atmosphere. In order to inhibit gellation, minor amounts of an inhibitor, such as a silazane may be blended with the reactants. A typical silazane inhibitor is hexamethylsilazane. The silazane reacts with any excess terminal hydroxy groups to form trimethylsilyl end groups which block the silanol condensation reactions which can cause gellation. Generally, the inhibitor is present in a respective weight ratio of inhibitor to aminofunctional fluid ranging from about 1.0:1.0 parts to about 1.0:100 and, preferably, from about 1:1 to about 1:10.

Likewise, the present composition can be further reacted with suitable reactants to form derivatives thereof. Suitable reactants are organocarboxylic acids which react with the amine functional compounds hereof to form amides. The amide derivatives formed hereby, under some circumstances, exhibit better compatibility with some silicone compounds in forming mold release agents. The carboxylic acid reactant may be either a monocarboxylic acid or a polycarboxylic acid. The acid may be aliphatic, aromatic, aralkyl, alkylaryl and the like. Representative monocarboxylic acids include, for example, caproic acid, caprylic acid, capric acid, lauric acid, myristic acid, palmitic acid, stearic acid, oleic acid, linoleic acid, cyclohexane carboxylic acid, benzoic acid and the like. Representative polycarboxylic acids include, for example, oxalic acid, malonic acid, glutaric acid, succinic acid, adipic acid, and so forth, as well as aromatic dicarboxylic acid, such as phthalic acid and the like.

When the acid is added to the aminofunctional organopolysiloxanes hereof and reacted therewith under heat, an amine salt is initially formed. Subsequent heating causes amide formation. Generally, the reaction proceeds at a temperature ranging from about 150° C. to about 300° C., and, preferably, at a temperature ranging from about 175° C. to about 275° C.

Ordinarily, the acid is employed in an amount ranging from about 1 to about 15 percent, by weight, based on the weight of the aminofunctional organopolysiloxane. Preferably, the acid is employed in an amount ranging from about 5 to about 10 percent, by weight, based on the weight of the aminofunctional organopolysiloxane.

For a more complete understanding of the present invention reference is made to the following detailed description and accompanying examples. In the examples, which are to be construed as illustrative, rather than limitative of the invention, all parts are by weight, absent indications to the contrary.

EXAMPLE I

Into a suitable reaction vessel equipped with stirring means and heating means is charged, under a nitrogen blanket and with stirring, 50 parts of a hydroxy-terminated organopolysiloxane fluid sold by Dow Corning under the name DC Q1-3563 and 13 parts of a trimethoxy aminofunctional silane sold by Kay-Fries Co. under the name DAMO silane, corresponding to the formula:

NH$_2$C$_2$H$_4$NHC$_3$H$_6$Si(OMe)$_3$ and 150 parts of an anti-gellation organosilicone fluid sold by Dow Corning under the name DC-200-[350 CSTKS], in the presence of one part of stannous octoate.

The mixture is heated to about 275° C. and held thereat for twenty minutes. The product is, then, cooled and filtered. Then, the product is stripped at 150° C. under vacuum for one hour.

A clear, yellow liquid product is recovered which is useful as a release agent.

EXAMPLE II

This example illustrates the preparation of an oleic acid amine functional amide derivative from the aminofunctional organopolysiloxane of Example I.

Into a suitable reaction vessel equipped with stirring means, heating means and nitrogen blanket is charged 100 parts of the aminofunctional organopolysiloxane fluid of Example and 7.75 parts of oleic acid. The mixture is stirred, at room temperature, for about 5 minutes. Then, 4.41 parts of bis(trimethylsilyl)amine sold by Dow Corning under the name DC-Z-6079 fluid is added thereto, and under a nitrogen blanket and with stirring, the mixture is heated to 260° C.

There is observed an evolution of gas at this temperature.

After the reaction is completed, in about 30 minutes, there is recovered, after cooling and filtering a clear, yellow liquid. This is useful as a release agent.

EXAMPLE III

This example illustrates the preparation of an aminofunctional organopolysiloxane fluid in accordance with the present invention.

Into a suitable reaction vessel equipped with heating means and stirring means was charged 75 parts of a methyl end-blocked anti-gellation organosilicone fluid sold by Union Carbide under the name UCC-L-45[350 CSTKS], 45 parts of a hydroxy-terminated dimethyl silicone fluid (80 CSTKS) sold by Dow Corning under the name DC Q1-3563, 7.8 parts the DAMO diaminomethoxysilane defined in Example I and 0.6 parts of dibutyltin dilaurate.

With stirring the mixture is heated to 275° C. and held thereat for about 20 minutes. After the reaction is completed there is obtained a clear, light yellow liquid.

This product so-produced is, then, used to prepare a release agent for use with urethane molds.

At room temperature and with stirring is mixed 10 parts of the product produced hereinabove and 90 parts of the anti-gellation agent UCC-L-45[350 CSTKS]. The product becomes hazy after about four hours, due to the presence of tin, but is still useful. When five parts of the mixture is mixed with 95 parts of FREON TF-triflourotrichloroethane there is obtained a mold release agent which evidences utility as a mold release agent for urethane shoe sole molds.

EXAMPLE IV

This example illustrates the preparation of an aminofunctional organopolysiloxane fluid in accordance herewith.

Into a suitable reaction vessel equipped with stirring means and nitrogen blanket is charged 150 parts of the anti-gellation agent used in Example III, 50 parts of the same hydroxy-terminated silicone fluid defined in Example I, 13 parts of imidazolinsilane and one part of stannous octoate. After stirring for about 20 minutes at 275° C. the reaction is completed and a clear liquid is obtained.

The product produced hereby is used to prepare a release agent by mixing together 10 parts of the product prepared hereinabove with 90 parts of the UCC-L-45[350 CSTKS].

Having, thus, described the invention what is claimed is:

1. A process for the preparation of an aminofunctional organosilicone compound comprising: reacting a silanol terminated organo-silicone compound with an aminofunctional silane compound in the presence of a catalytic amount of an organo-metallic compound.

2. The process of claim 1 wherein the catalyst is an organo-tin compound.

3. The process of claim 2 wherein the catalyst is dibutyltin dilaurate.

4. The process of claim 2 wherein the catalyst is stannous octoate.

5. The process of claim 3 or 4 wherein the catalyst is employed in amounts ranging from 0.4 to about 1.0 percent, by weight, based on the weight of the silanol terminated organosilicone compound.

6. The process of claim 1 wherein the silanol terminated organosilicone compound is an organopolysiloxane corresponding to the formula:

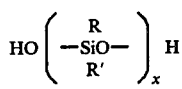

wherein R and R' are monovalent organic radicals selected from the group consisting of aliphatic and aromatic hydrocarbon organic radicals as well as mixtures thereof having up to about 18 carbon atoms, and x is an integer from 1 to 1000.

7. The process of claim 1 wherein the amino organosilicone is a diaminosilane corresponding to the formula:

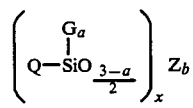

wherein G represents the radicals R, OR', OR"NR'$_2$, or OSiR$_3$ in which R is the same as R above, R' represents hydrogen, or monovalent hydrocarbon radicals having from 1 to 18 carbon atoms, R" is a substituted, or unsubstituted divalent hydrocarbon radical having from 1 to 18 carbon atoms, a substituted, or unsubstituted divalent hydrocarbonoxy radical in which the oxygen is in the form of an ether linkage, or an unsaturated divalent hydrocarbon radical Q represents the radicals.

8. The process of claim 10 wherein the diaminosilane is selected from the group consisting of:

B-aminopropyltriethoxysilane, γ-aminopropyltrimethoxysilane, methyl-B-(aminoethyl) γ-aminopropyldimethoxysilane, omega-aminohexyltributoxysilane, B-(aminoethoxy)propyltrimethoxysilane, B-(aminoethoxy)hexyltriethoxysilane, B-(aminopropoxy)butyltributoxysilane, methyl-B-(aminopropoxy)propyldi-(aminoethoxy)silane, N-β-(aminoethyl)-γ-aminopropyltrimethoxysilane,

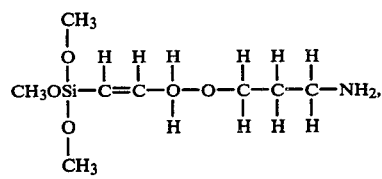

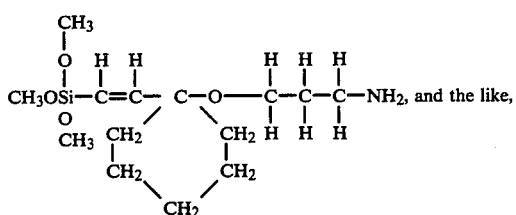

as well as mixtures thereof.

9. The process of claim 1 wherein the reaction is conducted at a temperature of between about 250° C. to about 300° C.

10. The process of claim 1 which further comprises: admixing an anti-gellation with the reactants.

11. The process of claim 1 wherein the anti-gellation agent is a silazane.

12. The process of claim 1 wherein the silazane is hexamethylsilazane.

13. The process of claim 1 which further comprises: reacting the so-produced aminofunctional polysiloxane with a carboxylic acid.

14. A mold release agent which comprises: the product of claim 1.

15. The mold release agent of claim 14 which further comprises:
a silazane anti-gellation agent.

* * * * *